United States Patent
Inglis

(10) Patent No.: US 9,625,302 B2
(45) Date of Patent: Apr. 18, 2017

(54) ADJUSTABLE PET FOOD SCOOP

(71) Applicant: TAILSCO LTD., Surrey (GB)

(72) Inventor: Joseph Matthew Inglis, Gloucestershire (GB)

(73) Assignee: TAILSCO LTD, Surrey (GB)

( * ) Notice: Subject to any disclaimer, the term of this patent is extended or adjusted under 35 U.S.C. 154(b) by 0 days.

(21) Appl. No.: 14/695,591

(22) Filed: Apr. 24, 2015

(65) Prior Publication Data
US 2015/0308876 A1    Oct. 29, 2015

(30) Foreign Application Priority Data

Apr. 25, 2014   (GB) .................................. 1407285.4
Jan. 6, 2015    (GB) .................................. 1500109.2

(51) Int. Cl.
*A47F 13/08*      (2006.01)
*G01F 19/00*      (2006.01)

(52) U.S. Cl.
CPC .................. *G01F 19/002* (2013.01)

(58) Field of Classification Search
CPC ...... G01F 19/002; G01F 19/007; G01F 19/00; E01H 2001/126; E01H 1/1206; A47F 13/08
USPC ........ 294/180, 1.3, 176; 229/125.19; 73/427
See application file for complete search history.

(56) References Cited

U.S. PATENT DOCUMENTS

| | | | | |
|---|---|---|---|---|
| 1,931,213 A * | 10/1933 | Wheeler | ............... | G01F 19/002 229/108 |
| 3,746,240 A * | 7/1973 | Flynn | ...................... | B65D 5/10 206/459.1 |
| 4,635,843 A * | 1/1987 | Tomlinson | ........... | A47G 21/001 229/117.18 |
| 5,301,870 A * | 4/1994 | Smith | ...................... | B65D 5/18 229/402 |
| 6,247,735 B1 * | 6/2001 | Berkman | .............. | E01H 1/1206 294/1.3 |
| 6,250,695 B1 * | 6/2001 | Berkman | .............. | E01H 1/1206 294/1.3 |
| 2004/0222650 A1 * | 11/2004 | Colesanti | .............. | E01H 1/1206 294/1.3 |
| 2005/0258655 A1 | 11/2005 | Matthews et al. | | |

(Continued)

FOREIGN PATENT DOCUMENTS

| | | | | |
|---|---|---|---|---|
| EP | 1283305 | | 8/2001 | |
| ES | WO 2008040831 A1 * | | 4/2008 | ............. A47L 13/52 |
| FR | 2746765 | | 3/1996 | |

(Continued)

OTHER PUBLICATIONS

UK search report for GB 1407285.4, Oct. 9, 2014, UK IPO.

(Continued)

*Primary Examiner* — Gabriela Puig
(74) *Attorney, Agent, or Firm* — Brian S. Boyer; Syndicated Law, PC

(57) ABSTRACT

An adjustable scoop comprising a sheet of flexible material having a periphery configured so that the sheet may be bent from a flat configuration to form a scoop having a curved body, two handles, a base and a cross member, wherein the cross member may be secured to the body at one of a plurality of locations so that the body, base and cross member form a receptacle having one of a plurality of volumetric capacities for particulate material.

19 Claims, 3 Drawing Sheets

(56) References Cited

U.S. PATENT DOCUMENTS

2010/0326848 A1* 12/2010 Mangin .............. B65D 33/1658
206/216

FOREIGN PATENT DOCUMENTS

| GB | 2479588 A * | 10/2011 | ............. G01F 19/00 |
| GB | 1407285.4 | 4/2014 | |
| GB | 1500109.2 | 1/2015 | |
| WO | WO 2008/040831 | 4/2008 | |

OTHER PUBLICATIONS

UK search report for GB 1500109.2, Sep. 23, 2015, UK IPO.
Collapsible KlipScoop, Portion Control for Healthy Pets. 3 in 1 Food Scoop, Measuring Cup & Bag clip, Amazon.com [online], available from http://www.amazon.com/Dexas-2-Cup-Collapsible-Scoop-Green/dp/B00C8XNQYY/ref=pd_sim_sbs_k_1?ie=UTF8&refRID=04Q327D0V1GZ1YYZSM.

* cited by examiner

ADJUSTABLE PET FOOD SCOOP

CROSS-REFERENCE TO RELATED APPLICATIONS

This application claims the benefit of priority from Great Britain Application Nos. GB1407285.4, filed Apr. 25, 2014, and GB1500109.2, filed Jan. 6, 2015, each of which is hereby incorporated herein by reference in its entirety.

BACKGROUND

Field of the Invention

This invention relates to a scoop for use in dispensing particulate material, particularly but not exclusively pellets or pieces of animal foodstuff, especially pet food for dogs, cats, rodents, fish or other animals.

Description of the Related Art

Pet food is commonly provided in bags or sacks which contain a sufficient quantity for several days supply of food. The food may take the form of pellets, biscuits or granules. Although particulate food can be poured from a sack, this may result in incorrectly sized portions being delivered. Delivery of correct portions of food will help combat pet obesity that is prevalent worldwide. Recent statistics show that almost half of all cats and dogs in the United Kingdom are classified as obese. A large sack may be difficult to manipulate and control with consequential spillage. A further problem is that a sack may remain open after a portion has been dispensed. This may permit ingress of vermin and may allow the contents of the sack to become stale. Dispensing portions using a cup or by hand may result in underfeeding or overfeeding.

SUMMARY

According to a first aspect of the present invention, an adjustable scoop comprises a sheet of flexible material having a periphery configured so that the sheet may be bent from a flat configuration to form a curved body, two handles, a base and a cross member, wherein the cross member may be secured to the body at a plurality of locations so that the body, base and cross member form a receptacle having a plurality of capacities for particulate material.

The invention relates particularly to an adjustable pet food scoop.

A scoop in accordance with this invention may be provided as a flat sheet which may be folded and assembled by a user to form an operative scoop. The sheet may be assembled to form a scoop with an appropriate capacity. The capacity of the scoop may be defined by the volume defined by the curved body, base and cross member.

In a preferred embodiment, the unfolded flat scoop sheet has a centre line which extends upwardly in the assembled configuration, so that the sheet is bilaterally symmetrical. Alternatively, peripheral parts of the sheet, for example the handles, may not be symmetrical in order to reduce weight and material costs. However, it is advantageous that the scoop body, base and cross member are generally symmetrical.

The cross member and body may be formed with interengageable lugs and slots to allow the side edges of the cross member to be engaged with parts of the folded body arranged in suitably spaced relation and preferably generally parallel.

Most preferably, the sides of the cross member have outwardly extending lugs dimensioned to be engaged in respective slots of the body portion.

An array of slots may be provided on each side of the body to allow the cross member to be secured at each of a plurality of locations. This provides a scoop with adjustable volumetric capacity.

In a preferred embodiment, the scoop may be bent from a flat storage configuration to a plurality of assembled configurations in which it may be used to scoop particulate material such as pet food.

In an assembled configuration, the body may be bent through approximately 180 degrees, so that the handles extend rearwardly from the scoop in generally parallel directions. Alternatively, the body may be curved through more than 180 degrees so that the handles converge at their rearward ends.

The scoop receptacle formed by the body and cross member may be D-shaped in plan view.

In a preferred embodiment, the scoop in the flat configuration comprises a body having an upper edge; two handles extending outwardly from opposite sides of the body; a base portion extending downwardly from a lower side of the body; and, a cross member extending downwardly from the base portion.

The body may have a generally four sided configuration with an upper edge which may be concave or convex to form the lip of the scoop.

The width of the body portion may increase towards the upper edge so that the cross section of the scoop increases upwardly from the base towards the lip.

Each side of the body may have a lower slot and a plurality of upper slots, the sides of the cross member each having two lugs, a lower lug (in the assembled configuration) being arranged to engage the lower slot and an upper lug (in the assembled configuration) being arranged to engage one of the upper slots to form a receptacle with a predetermined adjustable volume.

The upper slots are preferably located at the same radial distance from the lower slot.

In the flat configuration, the lower portion and cross member preferably form a downwardly extending tongue with a continuous width, the lower edge of the cross member being configured to form a continuous lip with the upper edge of the body portion in the assembled configuration.

The scoop may be formed from suitable bendable material which preferably does not fold or crease during normal use. Bendable polymeric sheet, card, board or polymer coated paper, card or board may be employed.

The handles may extend outwardly from the body portion to form an upper edge which is continuous with the scoop lip. The handles may have cut-out portions to form loops through which a user's finger or fingers may be received.

The two handles preferably have the same configuration so that the scoop may be completely bilaterally symmetrical.

In a particularly advantageous embodiment, the lower edge of the body and handles are provided with two downwardly opening slots, having a width and depth selected to permit the scoop to be engaged on an opened edge or a folded or rolled over edge of a pet food bag or sack. In this embodiment the scoop may be used to retain the bag or sack in a tightly closed condition and may also facilitate convenient storage of the scoop when not in use so that it may be easily located by a user.

In a second aspect of the present invention, there is provided an adjustable scoop as previously described, together with a pack comprising a bag or sack of pet food, slots of the scoop being dimensioned to engage folded over material from which the bag or sack is formed.

BRIEF DESCRIPTION OF THE DRAWINGS

The invention is further described by means of example, but not in any limitative sense, with reference to the accompanying drawings, of which.

DETAILED DESCRIPTION

Figure 1:
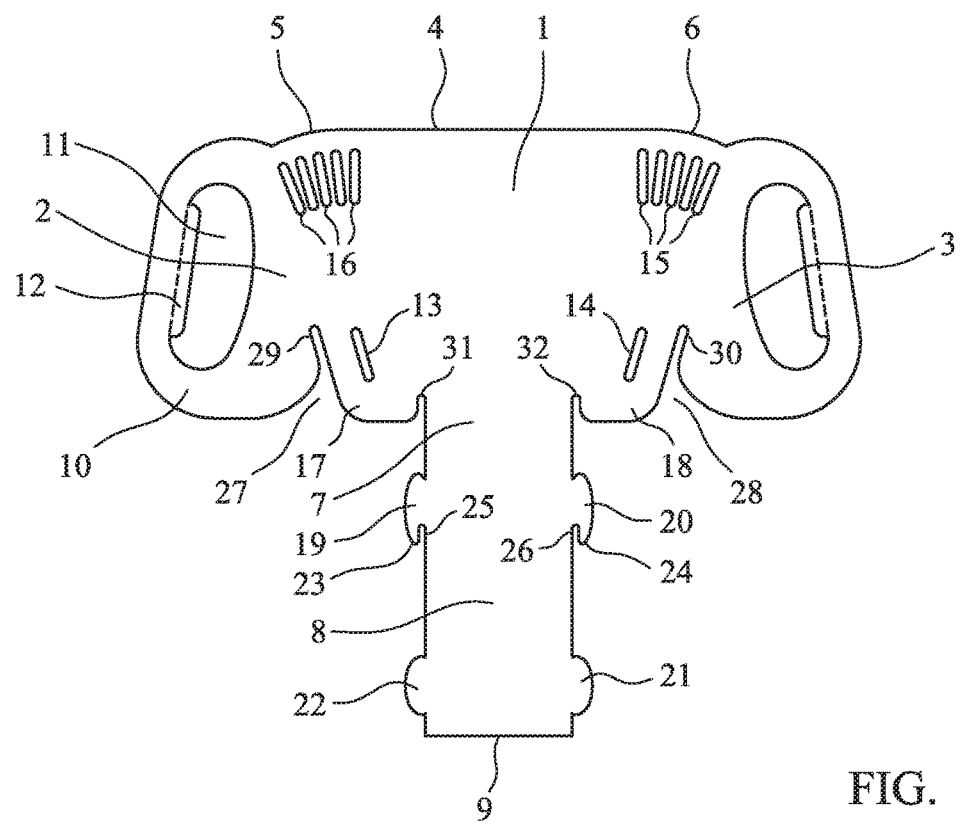
FIG. 1 is an unfolded blank for a scoop in accordance with this invention.
Figure 2:
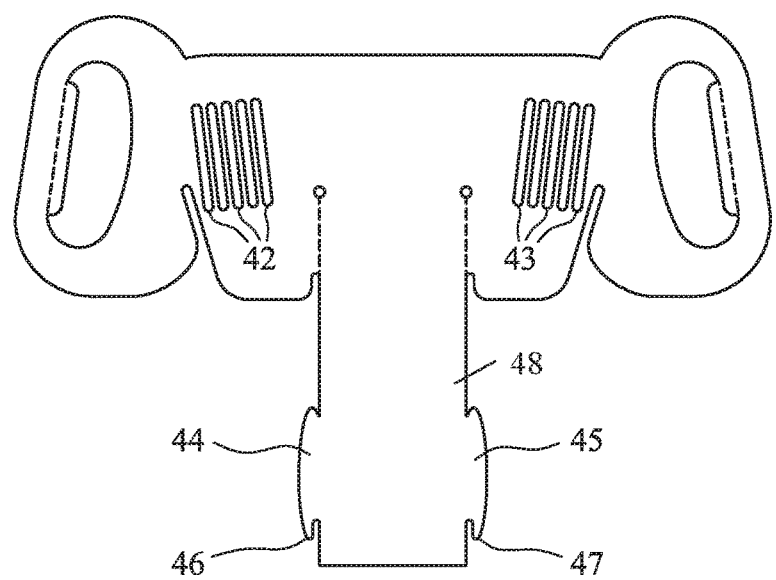
FIG. 2 is an unfolded blank for an alternative scoop in accordance with this invention.

FIGS. 1 and 2 show flat blanks for large and small size scoops in accordance with the present invention. The large size scoop shown in FIG. 1 comprises a body portion (1) having laterally extending portions (2,3) extending from the sides thereof and an upper lip (4) forming a continuous upper edge with the upper edges/lips (5,6) of the laterally extending portions (2,3). A base (7) extends downwardly from the body portion (1). The body portion (1) may be generally rectangular having slotted flanges (17,18) extending laterally and having handles (10) on their outer extremities. A cross member (8) extends downwardly from the base so that the base (7) and cross member (8) form a continuous tongue terminating in a lip (9). The lip (9) is dimensioned to be continuous with the upper lips (4,5,6) when the scoop is assembled. Each handle (10) having a cut-out (11) to form a loop through which a user's fingers may pass. A fold over flap (12) increases the thickness of the edge of the loop to increase a user's comfort when the handle is grasped.

Lower slots (13,14) are provided in slotted flanges (17,18) of the laterally extending portions (2,3) and are provided on each side of the scoop to receive corresponding lugs (19,20) extending outwardly from the cross member (8). An array of five upper slots (15,16) provided in upper portions of the flanges (17,18) extend radially from the location of the lower slots (14,13) respectively. Upper lugs (21,22) extend outwardly from the cross member (8) and are dimensioned to be received in the upper slots (15,16). The lower lugs (19,20) are formed with upwardly extending projections (23,24) defining slots (25,26). The slots (25,26) are located between the inner edge of the upwardly extending projections (23,24) and the side of the cross member (8). The slots are dimensioned so that the lower lugs (19,20) may be securely received in lower slots (13,14) in the lower handle portions. Upper lugs (21,22) are rounded without having slots and are shaped to be releasably secured in a selected one of the upper slots (15,16) to allow adjustment of the volume of the scoop.

The configuration of the lower lugs (19,20) allows the lower lugs (19,20) to be more securely engaged within the lower slots (13,14) than the upper lugs (21,22) are secured within the upper slots (15,16). This allows the upper lugs (21,22) to be moved between the upper slots (15,16) to change the capacity of the scoop without releasing the lower lugs (19,20). To disengage the lower lugs (19,20) from the lower slots (13,14) it is necessary to temporarily deform the lower lugs (19,20) through manual pressure, In contrast, no deformation of the upper lugs (21,22) is necessary to affect disengagement from the upper slots (15,16).

Slots (27,28) extend downwardly from the lower parts of the laterally extending portions (2,3). These slots have parallel sides (29,30) and wider downwardly opening portions configured to receive the folded edge of a pet food or other bag or sack to allow the scoop to be stored as described below.

Further slots (31,32) between the base and slotted flanges allow convenient folding as the scoop is assembled.

FIG. 2 shows a small scoop, the configuration is generally similar to the larger scoop shown in FIG. 1. However, the flanges have single arrays of slots (42,43) in place of the lower (13) and upper (16) slots shown in FIG. 1. Correspondingly single lugs (44,45) extend laterally from the cross member (48). The lugs (44,45) are provided with projections (46,47) dimensioned to be received into one of the corresponding slots (42,43) when the scoop is assembled.

To disengage the lugs (44,45) from the slots (42,43) it is necessary to temporarily deform the lugs (44,45) through manual pressure.

Figure 3:
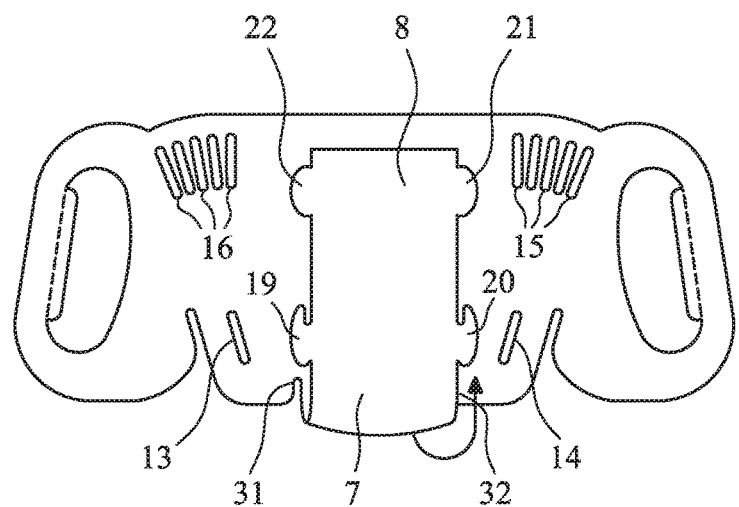
FIGS. 3-6 show successive stages of assembly of the scoop shown in FIG. 1; and, FIG. 7 shows the scoop secured to a bag of pet food.

FIG. 3 shows the base (7) and cross-member (8), seen in FIG. 1, folded at an 180° angle relative to the original flat configuration. The base (7) and cross-member (8) are bent into a curved configuration; facilitated by slots (31,32), whilst aligning lugs (19,20) with lower slots (13,14). Such alignment results in the upper lugs (21,22) being aligned with the inward extremities of upper slots (15,16).

Figure 4:
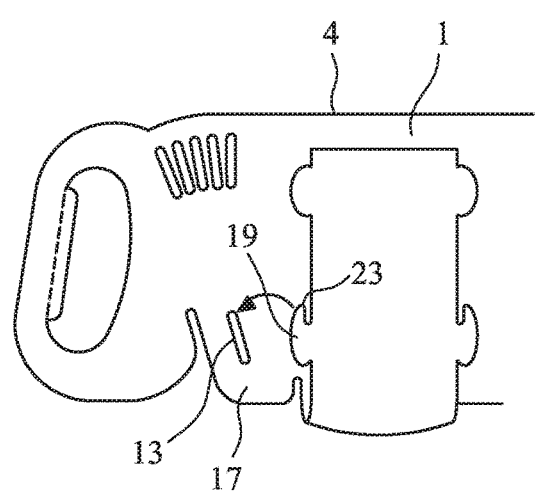

FIG. 4 shows the body portion (1) folded from a central point of the flange (17), running transverse along body portion (1) and intersecting with upper lip (4), resulting in lug (19) and lower slot (13) being in close proximity. Lug (19) is then brought into contact with lower slot (13) and through manual pressure is temporarily deformed through the folding of upwardly extending projection (23) in order to facilitate entry. Having received lug (19) through lower slot (13), the original integrity of lug (19) is resiliently acquired, resulting in a friction engaged fit.

Figure 5:
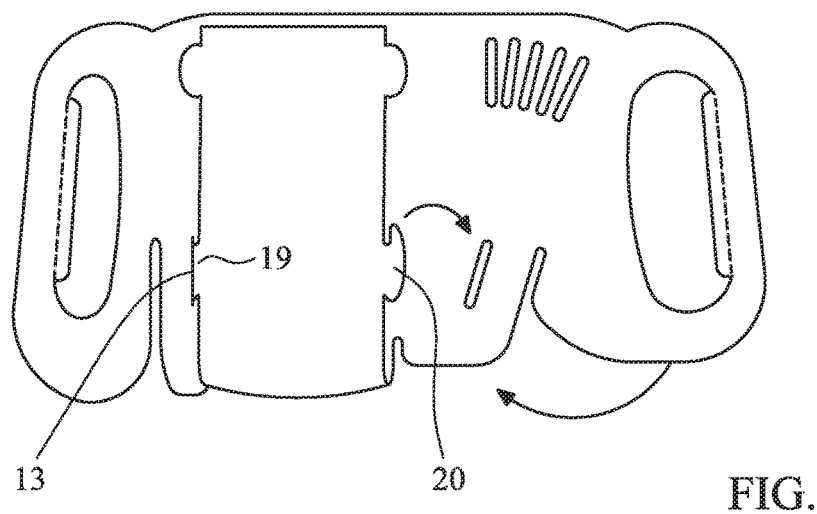

FIG. 5 shows lower slot (13) having received a lug (19) to establish a friction engaged fit, as discussed with reference to FIG. 4. The method of establishing a friction engaged fit between a lower slot (14) and lug (20) is the same as that discussed with reference to FIG. 4.

Figure 6:
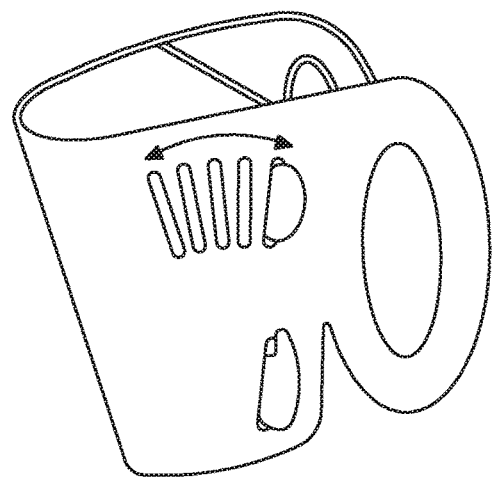

FIG. 6 shows an assembled scoop wherein the lower structural configuration is established through friction engaged fits between lugs (19,20) and lower slots (13,14) as discussed with reference to FIG. 4 or 5. The upper structural configuration is established through friction engaged fits between lugs (21,22) and upper slots (15,16). The size of the scoop receptacle can be altered in order to receive varying volumetric amounts by engaging lugs (21,22) in a plurality of upper slots (15,16). The resulting scoop has the upper lip (4) and lip (9) in the same plane.

Figure 7:
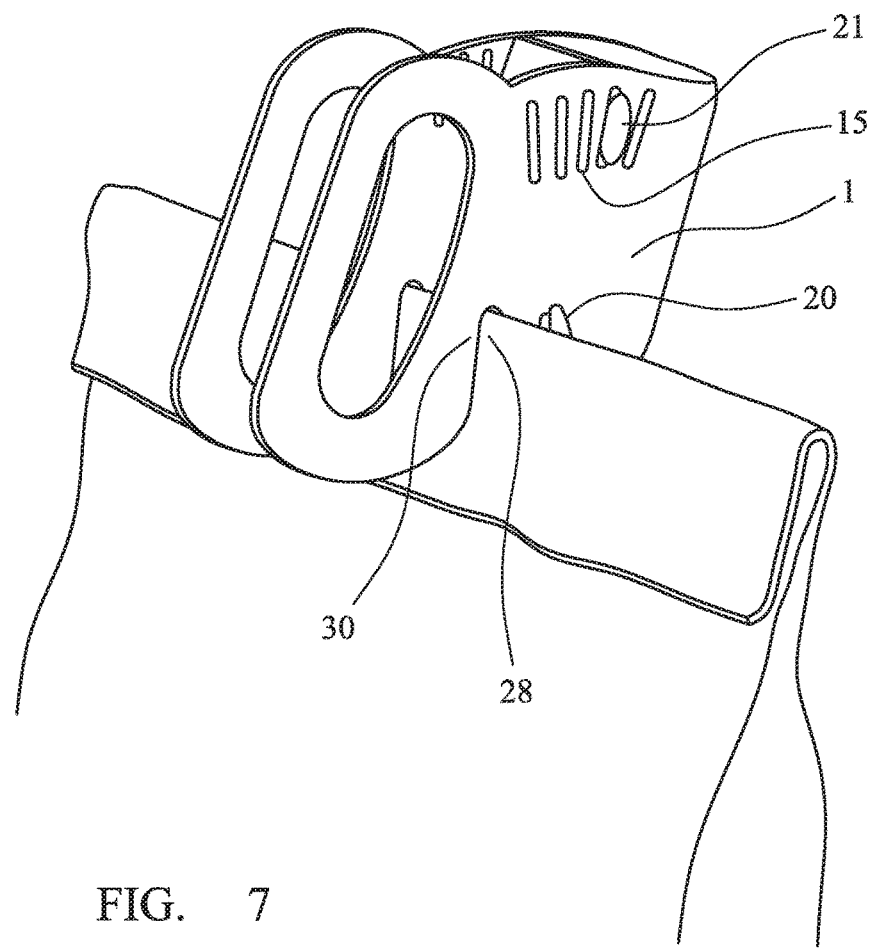

FIG. 7 shows the assembled scoop engaged on the folded opening of a sack for particulate material. The downwardly opening slots (27,28) are shown engaged on the edge of an opened sack, holding the sack in a closed position and enabling the scoop to be easily located for use and replaced on the sack after use.

The invention claimed is:

1. An adjustable scoop comprising a sheet of flexible material having a periphery configured so that the sheet may be bent from a flat configuration to form a scoop having a curved body, two handles, a base and a cross member, wherein the cross member may be secured to the body at one of a plurality of locations so that the body, base and cross member form a receptacle having one of a plurality of volumetric capacities for particulate material; wherein each side of the scoop comprises a lower slot and a plurality of upper slots, the sides of the cross member each having a lower lug in which to engage a lower slot and an upper lug arranged to engage an upper slot to form the assembled scoop.

2. A scoop as claimed in claim 1, wherein the unfolded flat sheet has a centre line.

3. A scoop as claimed in claim 2, wherein the sheet is bilaterally symmetrical.

4. A scoop as claimed in claim 1, wherein the cross member and body have inter-engageable lugs and slots to allow side edges of the cross member to be engaged with the folded body or handles.

5. A scoop as claimed in claim 4, wherein sides of the cross member have outwardly extending lugs.

6. A scoop as claimed in claim 1, wherein an array of slots is provided on each side of the body or handles to allow the cross member to be secured at one of a plurality of locations.

7. A scoop as claimed in claim 1, wherein in the assembled configuration the body is bent through 180°.

8. A scoop as claimed in claim 7, wherein the handles extend rearwardly from the scoop in the assembled configuration.

9. A scoop as claimed in claim 1, wherein the scoop receptacle in the assembled configuration is D-shaped in plan view.

10. A scoop as claimed in claim 1, comprising in the flat configuration a body having an upper edge;
two handles extending outwardly from opposite sides of the body;
a base portion extending downwardly from a lower side of the body; and,
a cross member extending downwardly from the base portion.

11. A scoop as claimed in claim 10, wherein the body has an upper edge which forms the lip of the scoop, handles extending from opposite sides of the body and the base extending downwardly from the body.

12. A scoop as claimed in claim 1, wherein in the assembled configuration the width of the body increases towards the upper edge.

13. A scoop as claimed in claim 1, wherein the lower lugs comprise upwardly extending projections and corresponding slots, the slots being located between the inner edge of the upwardly extending projections and the side of the cross member;
wherein the slots have sufficient depth to allow the lower lugs to be securely received in the lower handle slots; and,
wherein the upwardly extending projections of the lower lugs enables the lower lugs to be more securely engaged within the lower slots than the upper lugs are secured within the upper slots.

14. A scoop as claimed in claim 1, wherein the upper slots are located at the same radial distance from the lower slot.

15. A scoop as claimed in claim 1, wherein the base and cross member form a downwardly extending tongue having a continuous width, the lower edge of the cross member being configured to form a continuous lip with an edge of the body portion in the assembled configuration.

16. A scoop as claimed in claim 1, wherein the lower edge of the handles or body have downwardly opening slots.

17. A scoop as claimed in claim 16, wherein the downwardly opening slots have a width and depth selected to permit the scoop to be engaged with an opened edge or with a folded or rolled over edge of a pet food bag or sack.

18. A scoop as claimed in claim 1, in combination with a pack comprising a bag or sack of pet food, slots of the scoop being dimensioned to engage an open edge or folded over material from which the bag or sack is formed.

19. An adjustable scoop comprising a sheet of flexible material having a periphery configured so that the sheet may be bent from a flat configuration to form a scoop having a curved body, two handles, a base and a cross member, wherein:
the cross member may be secured to the body at one of a plurality of locations so that the body, base and cross member form a receptacle having one of a plurality of volumetric capacities for particulate material;
the unfolded flat sheet has a centre line;
the sheet is bilaterally symmetrical;
the cross member and body have inter-engageable lugs and slots to allow side edges of the cross member to be engaged with the folded body or handles; an array of slots is provided on each side of the body or handles to allow the cross member to be secured at one of a plurality of locations; and, the handles extend rearwardly from the scoop in the assembled configuration;
wherein each side of the scoop comprises a lower slot and a plurality of upper slots, the sides of the cross member each having a lower lug in which to engage a lower slot and an upper lug arranged to engage an upper slot to form the assembled scoop.

* * * * *